United States Patent [19]
Scott et al.

[11] Patent Number: 5,751,796
[45] Date of Patent: May 12, 1998

[54] RAPID STARTUP PROTOCOL FOR COMMUNICATION BETWEEN A PLURALITY OF MODEMS

[75] Inventors: Robert Earl Scott, Indian Rocks Beach; Edward S. Zuranski, Largo, both of Fla.

[73] Assignee: Paradyne Corporation, Largo, Fla.

[21] Appl. No.: 781,787

[22] Filed: Jan. 9, 1997

Related U.S. Application Data

[60] Provisional application No. 60/022,474, Jun. 21, 1996.

[51] Int. Cl.$^6$ .................................. H04M 11/00
[52] U.S. Cl. ........................ 379/93.31; 379/93.32; 379/93.34; 379/93.26; 379/222; 375/222; 455/557
[58] Field of Search .................. 379/93.01, 93.08, 379/93.26, 93.28, 93.31, 93.32, 93.34, 100.17; 455/414, 557; 375/222

[56] References Cited

U.S. PATENT DOCUMENTS

| | | |
|---|---|---|
| 4,931,250 | 6/1990 | Greszczuk ........................ 375/8 |
| 5,311,578 | 5/1994 | Bremer et al. ................. 379/93.32 |
| 5,528,679 | 6/1996 | Taarud ......................... 379/93.01 |

*Primary Examiner*—Curtis Kuntz
*Assistant Examiner*—Stephen W. Palan
*Attorney, Agent, or Firm*—Thomas, Kayden, Horstemeyer & Risley

[57] ABSTRACT

A system having an improved startup sequence for connecting two communicating modems, wherein the system includes a calling modem and an answer modem for communicating across an established communication link. Preferably, the system uses V.34 modulation protocol for information transfer after startup. In accordance with one aspect of the invention, an improved startup method includes the step of transmitting a unique calling signal from the calling modem, wherein the calling signal identifies the configuration of the calling modem. The modem "configuration" includes information relating to the communication capabilities of the modem, as well as information relating to the physical interconnection (or communication link) of the modem. The method further includes the step of transmitting a unique answer signal from the answer modem to the calling modem, wherein the answer signal identifies the configuration of the answer modem. Thereafter, the system operates to analyze the configuration of the calling modem and answer modem to determine whether the established link passes through a hybrid converter circuit. If the established link does not pass through a hybrid circuit, then the system omits line probing and echo training sequences that are typically executed in connection with the V.34 modulation standard. If, however, the established link does pass through a hybrid circuit, then the system proceeds with the execution of the line probing and echo training in accordance with the V.34 protocol.

12 Claims, 4 Drawing Sheets

RAPID STARTUP PROTOCOL FOR COMMUNICATION BETWEEN A PLURALITY OF MODEMS

CROSS-REFERENCE TO RELATED APPLICATION

The present application is based upon U.S. Provisional patent Application Ser. No. 60/022,474, filed Jun. 21, 1996.

FIELD OF THE INVENTION

The present invention generally relates to modem systems, and more particularly to a system for establishing a rapid connect and startup protocol for communications between two modems.

DISCUSSION OF THE RELATED ART

As is known, a variety of standards exist, which govern the protocol for communication between modems. For example, V.21, V.22., V.32, V.32bis, and V.34 are identifiers of differing communication modulation standards, just to name a few. Simply stated, communication standards govern how modems communicate information (voice and/or data) back and forth. With increased technology, more recent standards generally incorporate more sophistication and versatility than older standards.

For instance, the V.34 standard, which is intended for use on connections on general switched telephone networks and on point-to-point two-wire telephone type circuits includes the following primary characteristics: (1) full and half-duplex modes of operation; (2) echo cancellation techniques for channel separation; (3) quadrature amplitude modulation for each channel with synchronous line transmission at selectable symbol rates; (4) synchronous primary channel data signaling rates ranging from 2,400 bits per second to 33,600 bits per second, in 2,400 bit-per-second increments; (5) trellis coding for all data signaling rates; and (6) exchange of rate sequences during start-up to establish the data signaling rate. The features of the V.34 standard are documented in the publicly-available V.34 specification and well known by those skilled in the art, and will not be described in detail herein.

Another significant feature of the V.34 standard, as it relates to the present invention, is the ability to automode to other V.-series modems that are supported by the V.32bis Automode procedures. In this regard, the V.34 protocol standard defines signal handshaking that two connecting modems exchange at startup in order to learn the capabilities of the other modem to most efficiently exchange information.

While the V.34 protocol achieves efficient and generally high speed communication between two communicating modems, it nevertheless possesses several shortcomings that impede even more efficient operation. One such shortcoming relates to its universal, but fixed configuration. While the V.34 protocol standard is "intelligent" enough to identify and adapt its communication to communication protocols of other modems, its operation is fixed in relation to its operating environment. That is, a modem operating pursuant to the V.34 protocol operates in the same fashion regardless of whether it is communicating via cellular link, through a two-wire or four-wire PSTN network, through a leased line, a T1, etc. It is recognized, however, that certain "overhead" associated with the communication through some of these mediums is not needed when communicating through other mediums. For example, when communicating through a PSTN network, an initial two second connection period is required before information (voice or data) can be exchanged between the communicating modems. As is known, this two second delay is a requirement imposed by the FCC for billing purposes—in early telephone systems, customer billing did not occur during the first two seconds after the connection was established. As a result, systems generally delay the transmission of information for a period of two seconds after the initial connection is established..

Other shortcomings in, not only the V.34 protocol standard, but other contemporary modem system relates to the initial transmission from the calling modem to the answering. Presently, calling modems transmit the calling signal through a tone cadence, where a calling tone is transmitted for a period of time (typically 0.5 to 0.7 seconds in length), then the transmitter is turned off while the calling modem "listens" for a response from the answering modem. As is known, this cadence in the calling signal originated from older systems which employed echo suppressers. The initial startup sequence in systems employing echo suppressers must be half-duplex. Therefore, the calling modem had to stop transmitting the calling signal in order to "listen" for and receive the answer signal. Although echo suppressers have been replaced by echo cancellers (which permit full-duplex startup) in virtually all modern systems, modems still transmit the calling signal in cadence form. As a result the average time required for the calling and answering modems to signal their initial connection is unduly lengthy.

Another significant shortcoming associated with the lengthy startup sequence, and one which served as a motivation in developing the present invention, relates to reliability. As is known, the rather lengthy startup sequence comprises a number of operations including line detection, probing, ranging, equalization, and echo canceller training. Thereafter, modem communication parameters are set depending upon the results of the probing. Furthermore, the use of echo cancellation necessitates that the modem startup be performed in half-duplex mode. It has been found that, particularly over a cellular link, the long data exchange sequence that occurs at startup results in higher incidents of failure and thus compromises reliability. It has been further found that not all of the foregoing startup operations need to be performed. Instead, depending upon the medium of the established communication link, certain operations may be omitted and thereby shorten the overall connect time between two modems.

In summary, while multi-mode modem communication systems are known, these systems fail to recognize the communication environment or configuration, and therefore fail to achieve a dynamic, time-efficient, and reliable startup.

SUMMARY OF THE INVENTION

Accordingly, a primary object of the present invention is to provide an improved multi-mode modem for use in a modem communication system.

A more specific object of the present invention is to provide a multi-mode modem that provides a protocol for faster and more efficient startup operation based upon the system configuration and the path of the established communication link.

Another object of the present invention is to provide a multi-mode modem that is capable of determining whether the established communication link with a remote modem does not pass through a PSTN, and dynamically alter its startup sequence in such cases to achieve a more time-efficient startup sequence.

Still another object of the present invention is to provide a multi-mode modem that has improved reliability over multi-mode modems in the prior art.

Yet another object of the present invention is to provide a multi-mode modem that achieves a faster startup exchange that multi-mode modems in the prior art.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a system having an improved connect sequence between two communicating modems. More specifically, the system includes a calling modem and an answer modem for communicating across an established communication link using V.34 modulation protocol for information transfer after startup. In accordance with one aspect of the invention, an improved startup method includes the step of transmitting a unique calling signal from the calling modem, wherein the calling signal identifies the configuration of the calling modem. The modem "configuration" includes information relating to the communication capabilities of the modem, as well as information relating to the physical interconnection (or communication link) of the modem. The method further includes the step of transmitting a unique answer signal from the answer modem to the calling modem, wherein the answer signal identifies the configuration of the answer modem. Thereafter, the system operates to analyze the configuration of the calling modem and answer modem to determine whether the established link passes through a hybrid converter circuit. If the established link does not pass through a hybrid circuit, then the system omits line probing and echo training sequences that are typically executed in connection with the V.34 modulation standard. If, however, the established link does pass through a hybrid circuit, then the system proceeds with the execution of the line probing and echo training in accordance with the V.34 protocol.

In accordance with another aspect of the present invention, a system is provided having a calling modem and an answer modem for communicating across an established communication link using a communication protocol that defines a startup sequence that precedes a communication sequence, wherein the startup sequence is defined by full-duplex communication between the calling and answer modems transmitting and receiving signals in the same frequency band. In accordance with this further aspect, a method is provided for achieving a time-efficient startup sequence including the step of transmitting a unique calling signal from the calling modem to the answer modem, wherein the calling signal identifies the configuration of the calling modem. Thereafter, the answer modem transmits a unique answer signal back to the calling modem, the answer signal identifying the configuration of the answer modem. The system then analyzes the configuration of the calling modem and answer modem to determine whether the established link passes through a hybrid converter circuit. If so, then the system performs line probing and echo training sequence exchanges in a manner known in the prior art. If, however, the established link does not pass through a hybrid circuit, then the system operates to substantially omit such line probing and echo training sequences, and proceed substantially to full duplex equalizer training. In this way the overall connect time between two such modems may be substantially reduced.

DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
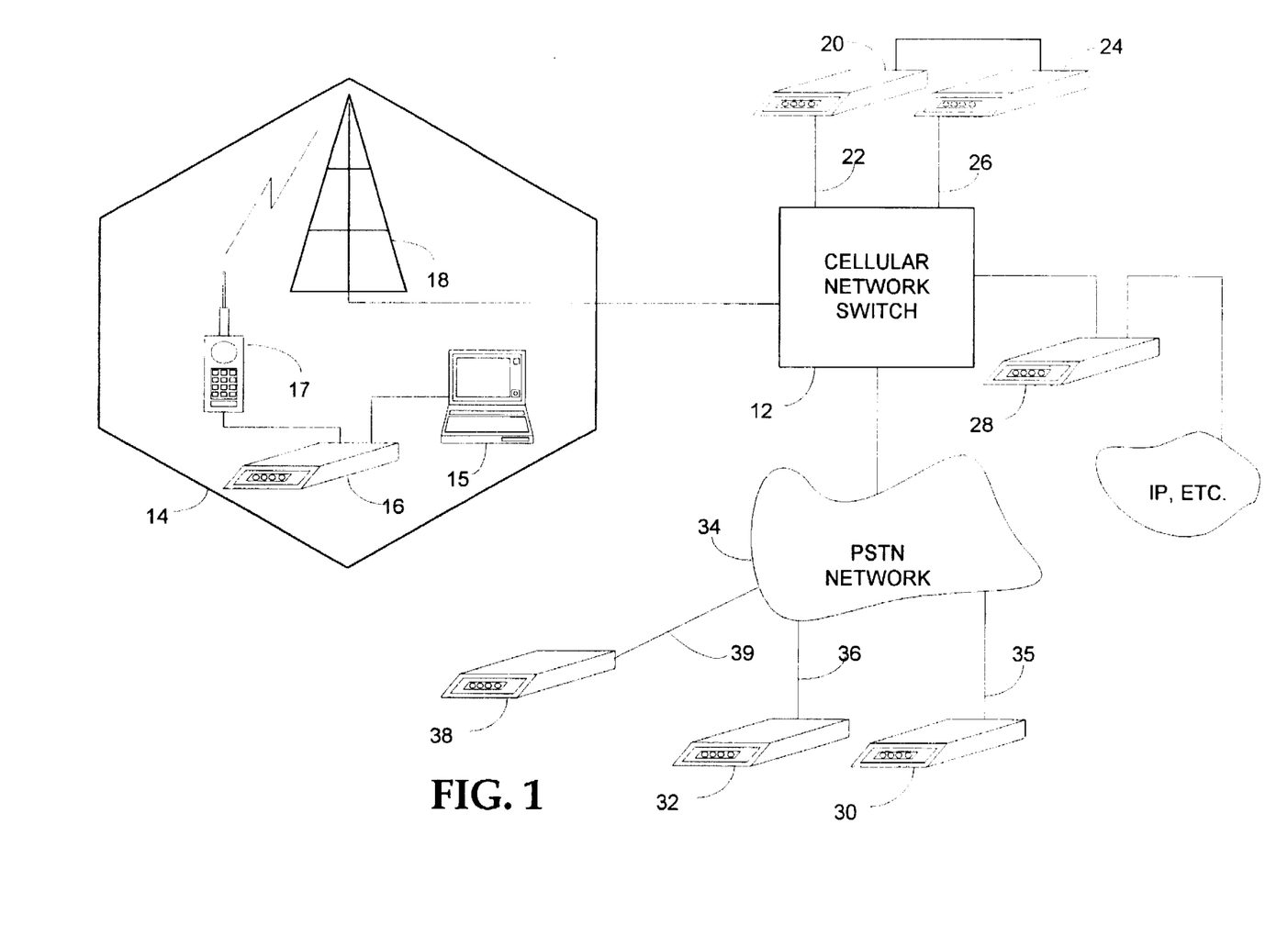
FIG. 1 is a system diagram, illustrating a multi-modem system wherein a plurality of modems are interconnected among a plurality of communication links.

Turning now to the drawings, FIG. 1 shows a system diagram of a system illustrating multiple modems intercommunicating through a variety of mediums, including cellular and PSTN. Indeed, as previously mentioned, a driving factor in the development of the present invention was to design a system that provided improved reliability in data communication over a cellular link. This goal has been achieve by providing a more robust startup sequence for modem communication. Thus, FIG. 1 illustrates a multiple-modem system centered around a cellular network switch 12.

As illustrated, a cellular modem system 14 may be disposed for communication with the cellular network switch 12. More specifically, a portable computer 15 may be connected via cellular modem 16 to a cellular phone 17, which in turn communicates (wireless) with a cell tower 18 that communicates with the cellular switched network 12. It is appreciated that the modem 16 recognizes that it is on the cellular side via a strap or configuration setting, or alternatively by a direct connect sensing of the cellular phone. Therefore, and as will be discussed in more detail below, the modem 16 will know that it is capable of communicating in accordance with the modulation standard of the present invention.

The cellular network switch 12 is also connected to a modem pool, including modems 20 and 24. The modems 20 and 24 are illustrated as connected in back-to-back configuration and communicating to the cellular network switch 12 over links 22 and 26. As will be appreciated and discussed below, the links 22 and 26 will support different communication protocols, or different modulation standards.

By way of definition, a "Central-site" modem is one that is capable of supporting the modulation standard of the present invention, and is not connected to a cellular phone. In this regard, all central-site modems are connected via four-wire connection. Examples which are illustrated in FIG. 1 include an MSC(Cellular) modem 20, an MSC (PSTN) modem 24, an MSC(Single-ended) modem 28, and a PSTN(ETC2) modem 30—where an MSC modem is one that is connected at a Mobile Switching Center. A significance of the distinction among these various types of modems relates to the startup sequence, which will differ slightly depending upon the type of central-site modem. Preferably, a hardware identifier, such as a DIP switch or a firmware option configurable at modem installation, defines the type of modem for purposes of the startup sequence.

In keeping with the description of FIG. 1, modem 20 is illustrated as an MSC(Cellular) modem that is connected in a back-to-back mode with modem 24, an MSC(PSTN) modem. Modem 20, therefore, is designed to support the ETC2 modulation protocol of the present invention and simulate a cellular modem during the initial modem startup routine. Modem 28 is an MSC(Single-ended) modem that, although it may communicate with modems on the PSTN 34, will typically communicate only with cellular modems. Indeed, when communicating with cellular modems the 2100 Hertz tone, which is typically inserted for billing purposes and to disable echo cancellers, is preferably omitted. Advantageously, elimination of this tone achieves a faster and more desirable modem startup.

A PSTN(ETC2) modem 30 and a standard PSTN modem are connected via PSTN 34 to the cellular network switch 12. The modem 30 is connected to the PSTN 34 via a four-wire connection 35, and modem 32 via a two-wire connection 36. Consistent with the concepts and teachings of the present invention, the four-wire connection 35 facilitates the communication of modem 30 with a cellular modem 16, for example, in the ETC2 modulation standard of the present invention. However, as will be appreciated by those of ordinary skill in the art, merely ensuring a four-wire connection 35 alone will not ensure proper system operation in accordance with the present invention. In this regard, such a four-wire connection 35 may nevertheless pass through a two-wire connection, and thus a hybrid converter circuit, at the central office. In this event, echo will be injected into the signal and the abbreviated modulation standard of the present invention may be compromised. There are, however, steps that may be taken to ensure proper operation of the invention. These include, (1) for T1 service, requesting that the Local Exchange Carrier avoid a 2-wire connection by connecting to the "trunk" side of the switch; and (2) obtaining an ISDN PRI or BRI connection, as it will always support four-wire for both call origination and call answer.

By way of illustration, consider a call originated by the computer 15 and cellular modem 16 to the standard PSTN modem 32. The established communication link will pass through the cellular phone 17 to the cell tower 18, through the cellular network switch 12, across link 22 to the MSC (Cellular) modem 20 and to the connected modem 24 via RS-232 connection 38, across link 26 and back through the cellular network switch 12 to the PSTN 34, and ultimately across the two-wire link 36 to modem 32. As will become clear from the description that follows, the cellular modem 16 and the MSC(Cellular) modem 20 will connect and startup in accordance with the communication protocol of the present invention. However, since the established communication link that passes from modem 24 to modem 32 passes through a PSTN 34 and a hybrid converter, then the communication protocol of the present invention will not be adequately supported. Accordingly, and in accordance with the invention, the modems 24 and 32 will identify this situation and will connect and communicate using an alternative communication protocol supported by both modems and capable of effective transmission across the established link. In this regard, the overall communication link does not realize the fast startup provided by the present invention.

Indeed, a primary feature of the present invention is for connecting modems to determine whether they both compatible, in terms of communication protocol, and whether they are connected through a line that passes through a 2-wire to 4-wire hybrid on the PSTN. If the modems are compatible and the established communication link is does not pass through a 2-wire to 4-wire hybrid on the PSTN (e.g., cellular to MSC), then the modems may connect and begin their startup sequence in accordance with the present invention. In this regard, the communication protocol of the present invention is designed to be fast as well as robust, and is accomplished by the use of simple tones. The use of such simple tones facilitates the implementation of the automatic mode select to be in the modem's control processor rather than the digital signal processor (DSP) chip.

In addition to the preferred communication protocol of the present invention, which will be discussed in more detail below, the preferred embodiment also includes several "fall-back" modulations. More particularly, the modem of the present invention will preferably include ETC1, V.34, V.32bis, V.32, and V.22bis modulations. Thus, in the previous example, modems 24 and 32 may communicate using one of these communication protocols. These modulation protocols are documented and will be understood by persons of ordinary skill in the art, and will not be discussed herein. Suffice it to say that supporting the above-listed modulation standards greatly enhances the flexibility and versatility of modems constructed in accordance with the present invention.

Figure 2:
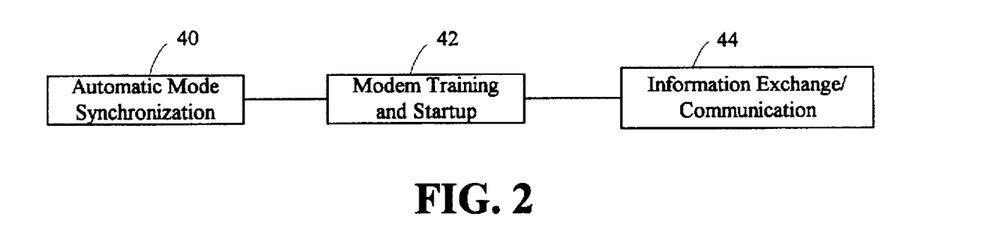
FIG. 2 is a diagram illustrating the primary handshaking and data exchange sequences between a calling and an answer modem.
Figure 3A:
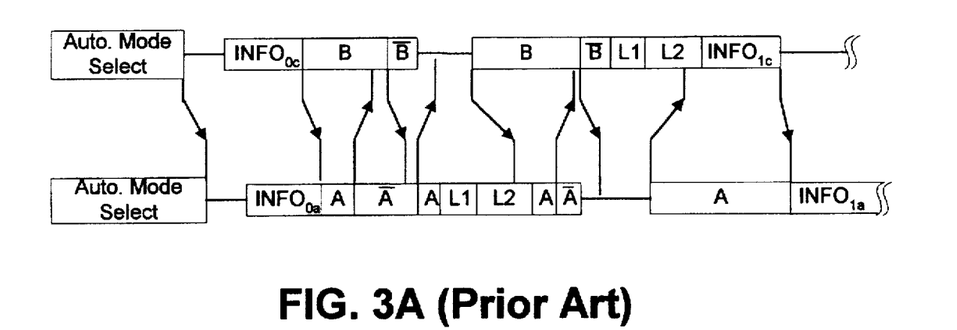
FIGS. 3A, 3B, and 3C together illustrate the startup and training sequence as implemented in the V.34 standard of the prior art.
Figure 3B:
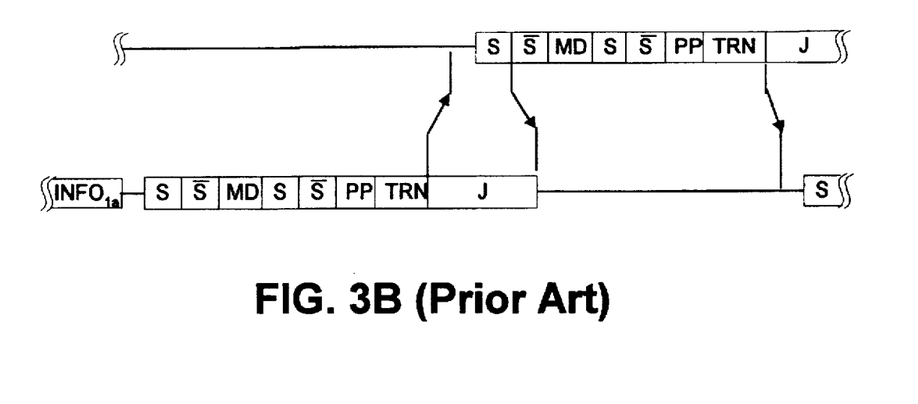
Figure 3C:
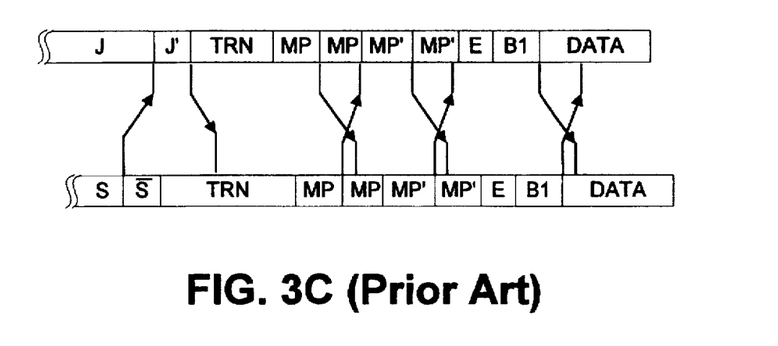

To more particularly describe the initial startup sequence in accordance with the modulation standard of the present invention, reference is made to FIGS. 2 and 3. FIG. 2 illustrates the three principal components of modem exchange or communication. After the sequence of dial tones are transmitted, such that a communication link is established, the modems enter a mode select operation 40. During this period, the modems exchange parameters that identify the modems and thus their communication protocol. This operation 40, thus, synchronizes the modems for communication in accordance with the same standard or protocol, such as V.34, V.22, V.22bis, etc.

Once the modems have synchronized their communication protocol, or modulation standard, then they enter a training and startup sequence 42. In a manner known in the art, during this sequence the modems may test the established communication link for noise, bandwidth, etc. in order to determine an appropriate rate for communication. The modems may also operate during this period to train their internal echo cancellers by, for example, ranging the established link of communication. In accordance with a related aspect of the present invention under certain circumstances the modem training and startup sequence may be significantly shortened to provide a more robust (both time-shortened and reliable) startup sequence. More particularly, the "circumstances" which provide such a robust startup include communicating modems constructed in accordance with the invention detecting an established link of communication that does not pass through any two-wire connections.

After the modem training and startup sequence 42 has completed, the communicating modems enter the information exchange/communication sequence 44. During this sequence, the modems have exchanged operational and definitional parameters and are communicating data back and forth. Error correction, dynamic autorating, and other similar features, whether known in the prior art or newly developed, may be employed consistent with the concepts and teachings of the present invention.

To focus now on the specific teachings and implementation of the present invention, the present invention relates to an improved startup and echo training sequence. In order to implement the improved startup and training of the present invention, it is assumed that both modems are connected in four-wire fashion and that the established communication link does not pass through a PSTN 2-wire hybrid. To better illustrate the improvements of the present invention, reference is first made to FIGS. 3A, 3B, and 3C, which illustrate the startup and training sequence as implemented in the V.34 standard of the prior art. Also, reference is made to Table 1 through Table 4, below, which define the information contained in the data and information sequences illustrated in the timing diagrams of FIGS. 3A-3C. It is noted that the timing diagrams of FIGS. 3A through 3C are continuous. That is, the rightmost portion of FIG. 3A is continued at the leftmost portion of FIG. 3B, and the rightmost portion of FIG. 3B is continued at the leftmost portion of FIG. 3C.

TABLE 1

| Bits LSB:MSB | MP0 |
|---|---|
| 0:16 | Frame Synch: 11111111111111111 |
| 17 | Start bit: 0 |
| 18 | Type: 0 |
| 19 | Reserved for ITU: This bit is set to 0 by the transmitting modem and is not interpreted by the receiving modem. |
| 20:23 | Maximum call modem to answer modem data signaling rate Data rate = N*2400 where N is a four-bit integer between 1 and 14. |
| 24:27 | Maximum answer modem to call modem data signaling rate Data rate = N*2400 where N is a four-bit integer between 1 and 14. |
| 28 | Auxiliary channel select bit. Set to 1 if modem is capable of supporting and enables auxiliary channel. Auxiliary channel is used only if both modems set this bit to 1. |
| 29:30 | Trellis encoder select bits: 0 = 16 state, 1 = 32 state, 2 = 64 state, 3 = reserved for ITU. Receiver requires remote-end transmitter to use selected trellis encoder. |
| 31 | Nonlinear encoder parameter select bit for the remote-end transmitter. 0: Θ = 0, 1: Θ = 0.3125 |
| 32 | Constellation shaping select bit for the remote-end transmitter. 0: minimum, 1: expanded (see Table 10/V.34) |
| 33 | Acknowledge bit. 0 = modem has not received MP from far end. 1 = received MP from far end. |
| 34 | Start bit: 0 |
| 35:49 | Data signaling rate capability mask. Bit 35:2400; bit 36:4800; bit 37:7200; . . . ; bit 46:28800; bit 47:31200; bit 48:33600; bit 49: Reserved for ITU (This bit is set to 0 by the transmitting modem and is not interpreted by the receiving modem.). Bits set to 1 indicate data signaling rates supported and enabled in both transmitter and receiver of modem. |
| 50 | Asymmetric data signaling rate enable. Set to 1 indicates modem capable of asymmetric data signaling rates. |
| 51 | Start bit: 0 |
| 52:67 | Reserved for ITU: These bits are set to 0 by the transmitting modem and are not interpreted by the receiving modem. |
| 68 | Start bit: 0 |
| 69:84 | CRC |
| 85:87 | Fill bits: 000 |

TABLE 2

| Bits LSB:MSB | INFO0 |
|---|---|
| 0:3 | Fill bits: 1111 |
| 4:11 | Frame Sync: 01110010, where the left-most bits is first in time. |
| 12 | Set to 1 indicates symbol rate 2743 is supported. |
| 13 | Set to 1 indicates symbol rate 2800 is supported. |
| 14 | Set to 1 indicates symbol rate 3429 is supported. |
| 15 | Set to 1 indicates the ability to transmit at the low carrier frequency with a symbol rate of 3000. |
| 16 | Set to 1 indicates the ability to transmit at the high carrier frequency with a symbol rate of 3000. |
| 17 | Set to 1 indicates the ability to transmit at the low carrier frequency with a symbol rate of 3200. |
| 18 | Set to 1 indicates the ability to transmit at the high carrier frequency with a symbol rate of 3200. |
| 19 | Set to 0 indicates that transmission with a symbol rate of 3429 is disallowed. |
| 20 | Set to 1 indicates the ability to reduce transmit power to a value lower than the nominal setting. |
| 21:23 | Maximum allowed difference in symbol rates in the transmit and receive directions. With the symbol rates labeled in increasing order, where 0 represents 2400 and 5 represents 3429, an integer between 0 and 5 indicates the difference allowed in number of symbol rate steps. |
| 24 | Set to 1 in an INFO0 sequence transmitted from a CME modem. |
| 25 | Set to 1 indicates the ability to support up to 1664 point signal constellations. |
| 26:27 | Transmit clock source: 0 = internal, 1 = synchronized to receive timing, 2 = external, 3 = reserved for ITU. |
| 28 | Set to 1 to acknowledge correct reception of an INFO0 frame during error recovery. |
| 29:44 | CRC |
| 45:48 | Fill bits: 1111 |

TABLE 3

| Bits LSB:MSB | INFO1c |
|---|---|
| 0:3 | Fill bits: 1111 |
| 4:11 | Frame Sync: 01110010, where the left-most bit is first in time. |
| 12:14 | Minimum power reduction to be implemented by the answer modem transmitter. An integer between 0 and 7 gives the recommended power reduction in dB. These bits shall indicate 0 if INFO0a indicated that the answer modem transmitter cannot reduce its power. |
| 15:17 | Additional power reduction, below that indicated by bits 12–14, which can be tolerated by the call modem receiver. An integer between 0 and 7 gives the additional power reduction in dB. These bits shall indicate 0 if INFO0a indicated that the answer modem transmitter cannot reduce its power. |
| 18:24 | Length of MD to be transmitted by the call modem during Phase 3. An integer between 0 and 127 gives the length of this sequence in 35 ms increments. |
| 25 | Set to 1 indicates that the high carrier frequency is to be used in transmitting from the answer modem to the call modem for a symbol rate of 2400. |
| 26:29 | Pre-emphasis filter to be used in transmitting from the answer modem to the call modem for a symbol rate of 2400. These bits form an integer between 0 and 10 which represents the pre-emphasis filter index (see Tables 3/V.34 and 4/V.34). |
| 30:33 | Projected maximum data rate for a symbol rate of 2400. These bits form an integer between 0 and 14 which gives the projected data rate as a multiple of 2400 bits/s. A 0 indicates the symbol rate cannot be used. |
| 34:42 | Probing results pertaining to a final symbol rate selection of 2743 symbols per second. The coding of these 9 bits is identical to that for bits 25–33. |
| 43:51 | Probing results pertaining to a final symbol rate selection of 2800 symbols per second. The coding of these 9 bits is identical to that for bits 25–33. |
| 52:60 | Probing results pertaining to a final symbol rate selection of 3000 symbols per second. The coding of these 9 bits is |

TABLE 3-continued

| Bits LSB:MSB | INFO1c |
|---|---|
| | identical to that for bits 25–33. Information in this field shall be consistent with the answer modem capabilities indicated in INFO0a. |
| 61:69 | Probing results pertaining to a final symbol rate selection of 3200 symbols per second. The coding of these 9 bits is identical to that for bits 25–33. Information in this field shall be consistent with the answer modem capabilities indicated in INFO0a. |
| 70:78 | Probing results pertaining to a final symbol rate selection of 3429 symbols per second. The coding of these 9 bits is identical to that for bits 25–33. Information in this field shall be consistent with the answer modem capabilities indicated in INFO0a. |
| 79:88 | Frequency offset of the probing tones as measured by the call modem receiver. The frequency offset number shall be the difference between the nominal 1050 Hz line probing signal tone received and the 1050 Hz tone transmitted, f(received) − f(transmitted). A two's complement signed integer between −511 and 511 gives the measured offset in 0.02-Hz increments. Bit 88 is the sign bit of this integer. The frequency offset measurement shall be accurate to 0.25 Hz. Under conditions where this accuracy cannot be achieved, the integer shall be set to −512 indicating that this field is to be ignored. |
| 89:104 | CRC |
| 105:108 | Fill bits: 1111 |

TABLE 4

| Bits LSB:MSB | INFO1a |
|---|---|
| 0:3 | Fill bits: 1111 |
| 4:11 | Frame Sync: 01110010, where the left most bit is first in time. |
| 12:14 | Minimum power reduction to be implemented by the call modem transmitter. An integer between 0 and 7 gives the recommended power reduction in dB. These bits shall indicate 0 if INFO0c indicated that the call modem transmitter cannot reduce its power. |
| 15:17 | Additional power reduction, below that indicated by bits 12:14, which can be tolerated by the answer modem receiver. An integer between 0 and 7 gives the additional power reduction in dB. These bits shall indicate 0 if INFO0c indicated that the call modem transmitter cannot reduce its power. |
| 18:24 | Length of MD to be transmitted by the answer modem during Phase 3. An integer between 0 and 127 gives the length of this sequence in 35 ms increments. |
| 25 | Set to 1 indicates that the high carrier frequency is to be used in transmitting from the call modem to the answer modem. This shall be consistent with the capabilities of the call modem indicated in INFO0c. |
| 26:29 | Pre-emphasis filter to be used in transmitting from the call modem tot he answer modem. These bits form an integer between 0 and 10 which represents the pre-emphasis filter index (see Tables 3/V.34 and 4/V.34). |
| 30:33 | Projected maximum data rate for the selected symbol rate from the call modem to the answer modem. These bits form an integer between 0 and 14 which gives the projected data rate as a multiple of 2400 bits/s. |
| 34:36 | Symbol rate to be used in transmitting from the answer modem to the call modem. An integer between 0 and 5 gives the symbol rate, where 0 represents 2400 and a 5 represents 3429. The symbol rate selected shall be consistent with information in INFO1c and consistent with the symbol rate asymmetry allowed as indicated in INFO0a and INFO0c. The carrier frequency and pre-emphasis filter to be used are those already indicated for this symbol rate in INFO1c. |
| 37:39 | Symbol rate to be used in transmitting from the call modem to the answer modem. An integer between 0 and 5 gives the symbol rate, where 0 represents 2400 and a 5 represents 3429. The symbol rate selected shall be consistent with the capabilities indicated in INFO0a and consistent with the symbol rate asymmetry allowed as indicated in INFO0a and INFO0c. |
| 40:49 | Frequency offset of the probing tones as measured by the answer modem receiver. The frequency offset number shall be the difference between the nominal 1050 Hz line probing signal tone received and the 1050 Hz tone transmitted, f(received) − f(transmitted). A two's complement signed integer between −511 and 511 gives the measured offset in 0.02 Hz increments. Bit 49 is the sign bit of this integer. The frequency offset measurement shall be accurate to 0.25 Hz. Under conditions where this accuracy cannot be achieved, the integer shall be set to −512 indicating that this field is to be ignored. |
| 50:65 | CRC |
| 66:69 | Fill bits: 1111 |

Note: Projected maximum data rates greater than 12 in bits 30:33 shall only be indicated when the remote modem supports up to 1664 point signal constellations.

It will be appreciated, however, that the information set forth in the foregoing tables will be known by those of ordinary skill in the art and is more particularly defined in published modem communication standards regarding the V.34 modulation standard.

Figure 4:
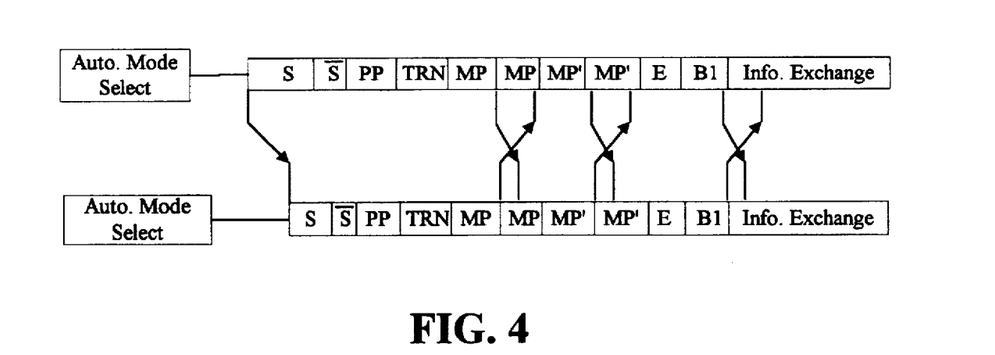
FIG. 4 is a timing diagram illustrating the modem training and echo canceling sequence performed by the present invention.

Reference is now made to FIG. 4, which illustrates the improvement of the present invention. FIG. 4 is a timing diagram illustrating the modem training and echo canceling sequence performed by the present invention. That is the diagram of FIG. 4 illustrates the information exchange that is made in place of that illustrated in FIGS. 3A–3C. The remainder of the communications and data exchanges (made after this training sequence) may be identical to that of the V.34 standard. Alternatively, and consistent with the concepts and teachings of the present invention, features such as autorating and retrains may be altered from the V.34 standard. It is preferred, however, that the data exchange will be made in accordance with the present invention.

Broadly, the present invention operates by making certain assumptions. Specifically, by knowing from the automatic mode synchronization 40 that both communicating modems are connected through an established communication link that is entirely four-wire and does not pass through PSTN 34 2-wire hybrids, the modems may make assumptions regarding the connection and force certain parameters (utilized in the V.34 communication protocol) usually determined during the startup and training sequence 42, to certain predefined default values. Tables 5 through 8, below, set forth those parameters that are forced to predefined default values, and therefore need not be determined nor exchanged. These tables are provided for illustrative purposes only, as is for when one of the modems is cellular-connected. If both modems are connected via 4-wire to the PSTN, a different set of predefined default values may be used. In this case, the Automode Select sequence identifies both modems as connected to the PSTN.

TABLE 5

| BITS | INFO$_{0c}$ and INFO$_{0a}$ |
|---|---|
| 12:19 | Enable 2800 symbol rate only |
| 20 | Disable ability to reduce local transmit power |
| 21:23 | Force symmetric symbol rates |
| 24 | No CME |
| 25 | No support for 1664 constellation |
| 26:27 | Internal Clock |

TABLE 6

| BITS | INFO₁c |
|---|---|
| 12:17 | 0 |
| | No Transmit level drop of remote modem |
| 25:33 | 0 |
| | 2400 symbol rate not used |
| 34:38 | 0 |
| | Use 2800L and de-emphasis for remote transmit |
| 39:42 | 21,600 and below supported for 2800 |
| 43:78 | 0 |
| | No other symbol rate enabled |

TABLE 7

BITS INFO₁ₐ

12:17 0
    No Transmit level drop of remote modem
18:24 No MD sequence
  25 0
    Use low carrier for remote transmitter
26:29 0
    Remote pre-emphasis filter is flat
    (remote modem will ignore and use de-emphasis)
30:33 21600
    Max data rate from call to answer (remote to local)
34:36 2
    Use 2800 symbol rate in answer to call (local to remote) direction
37:39 2
    Use 2800 symbol rate in call to answer direction (remote to local)
40:49 No frequency offset (since probing did not occur)

TABLE 8

| BITS | MPO |
|---|---|
| 18 | 0 |
| | Indicates MPO |
| | This effectively turns off Pre-coding in the receiver |
| 20:23 | Varies |
| | Max Call to Answer rate |
| | Start at 9600, then let autorating algorithm take over |
| 24:27 | Varies |
| | Max Answer to Call rate |
| | Start at 9600, then let autorating algorithm take over |
| 28 | 0 |
| | Auxiliary channel = OFF |
| 29:30 | 0 |
| | Trellis encoder in remote transmitter = 16 state |
| 31 | 1 |
| | Non-linear encoder = Forced ON in remote transmitter |
| 32 | 0 |
| | Constellation Shaping = Forced OFF in remote transmitter |
| 35:49 | Set all bits up to 21,600 |
| 50 | 1 |
| | Asymmetrical Rates = ON |

It will be appreciated by those skilled in the art that the present invention, as described above, achieves a much faster modem connect and startup period by eliminating line probing, and bypassing the half-duplex echo canceller training. Instead, the modems train their equalizers in full-duplex.

Figure 5:
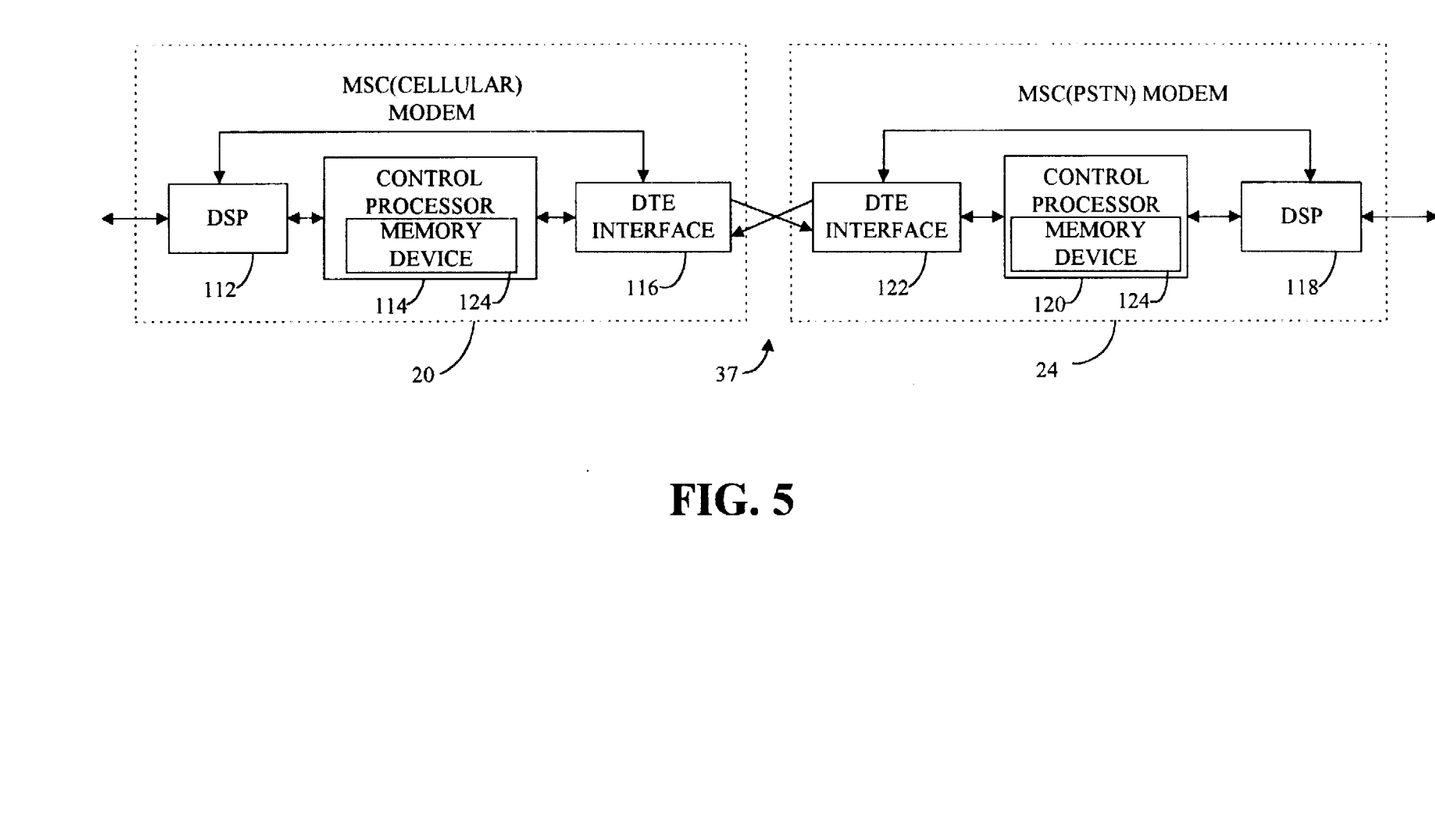
FIG. 5 is a block diagram illustrating the primary internal components in a pair of modems.

Regarding the implementation of the present invention, FIG. 5 generally illustrates the components of MSC (cellular) modem 20 and MSC(PSTN) modem 24. The MSC(cellular) modem 20 comprises a digital signal processor (DSP) 112, a central processor 114, and a DTE interface 116. Likewise, the MSC(PSTN) modem 24 comprises a DSP 118, a control processor 120, and a DTE interface 122. The DTE interface 116 of the MSC(cellular) modem 20 interfaces with the DTE interface 122 of the MSC(PSTN) modem 24 via the connection 37, which can be implemented by any suitable interconnecting device such as, but not limited to, an Electronic Industry Association (EIA) standard RS-232 cross-over or a backplane bus between the modems. As shown in FIG. 5, each modem 20, 24 is configured essentially the same, and thus, they operate in essentially the same manner. However, each modem is provided with operating code which is stored in a memory device 124 provided with the central processor 114, 120, though addition memory can also be provided, if necessary, and connected to the central processor 114, 120 if desired. In the context of the present disclosure, a memory device is a computer readable medium that is embodied in an electronic, magnetic, optical or other physical device or means that can contain or store a computer program, such as the operating code for the modem 20, 24, for use by or in connection with a computer related system or method. The operating code includes control logic that controls, among other things, the type of modulation and error correction techniques utilized which is dependent upon whether the modem is used for cellular or land-line connections. Accordingly, the central processor 114, 120 operates on, or executes, the operating code that is in memory device 124 and configured for implementing the present invention so as to control the operation of modem 36, 38.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In a system having a calling modem and an answer modem for communicating across an established communication link using V.34 modulation protocol for information transfer after startup, an improved startup method comprising the steps of:

transmitting a unique calling signal from the calling modem, the calling signal identifying the configuration of the calling modem;

transmitting a unique answer signal from the answer modem, the answer signal identifying the configuration of the answer modem;

analyzing the configuration of the calling modem and answer modem to determine whether the established link passes through a hybrid converter circuit; and     omitting the line probing and echo training, if the established link does not pass through a hybrid converter circuit.

2. The method as defined in claim 1, further including the step of proceeding with line probing and echo training in accordance with the V.34 protocol, if the established link passes through a hybrid converter circuit.

3. The method as defined in claim 1, wherein the calling signal includes frequency components of 1500 hertz and 1900 hertz.

4. The method as defined in claim 1, wherein the calling modem further includes configuration means for adjustably defining the configuration of the calling modem.

5. The method as defined in claim 1, wherein the answer modem further includes configuration means for adjustably defining the configuration of the answer modem.

6. In a system having a calling modem and an answer modem communicating across an established Public Switched Network (PSTN) communication link using a communication protocol that defines a startup sequence that precedes a communication sequence, wherein the startup sequence is defined by full-duplex communication between the calling and answer modems wherein the modems transmit and receive signals operate in the same frequency band, a method for achieving a time-efficient startup sequence comprising the steps of:

- transmitting a unique calling signal from the calling modem, the calling signal identifying the configuration of the calling modem;
- transmitting a unique answer signal from the answer modem, the answer signal identifying the configuration of the answer modem;
- analyzing the configuration of the calling modem and answer modem to determine whether the established link passes through a hybrid converter circuit;
- performing line probing and echo training sequence exchanges, if the established link passes through a hybrid converter; and
- omitting the line probing and echo training sequences, if the established link does not pass through a hybrid converter circuit.

7. The method as defined in claim 6, wherein the modem configuration includes information regarding network interconnection.

8. The method as defined in claim 7, wherein the modem configuration includes information regarding modem performance capabilities.

9. The method as defined in claim 6, wherein the calling signal includes frequency components of 1500 hertz and 1900 hertz.

10. The method as defined in claim 6, wherein the calling modem further includes configuration means for adjustably defining the configuration of the calling modem.

11. The method as defined in claim 6, wherein the answer modem further includes configuration means for adjustably defining the configuration of the answer modem.

12. In a system having a calling modem and an answer modem for communicating across an established communication link using V.34 modulation protocol for information transfer after startup, a computer readable storage medium containing program code for controlling an improved startup method comprising the steps of:

- transmitting a unique calling signal from the calling modem, the calling signal identifying the configuration of the calling modem;
- transmitting a unique answer signal from the answer modem, the answer signal identifying the configuration of the answer modem;
- analyzing the configuration of the calling modem and answer modem to determine whether the established link passes through a hybrid converter circuit; and
- omitting the line probing and echo training, if the established link does not pass through a hybrid converter circuit.

* * * * *

UNITED STATES PATENT AND TRADEMARK OFFICE
CERTIFICATE OF CORRECTION

PATENT NO.    : 5,751,796
DATED         : May 12, 1998
INVENTOR(S)   : Scott et al.

It is certified that error appears in the above-identified patent and that said Letters Patent is hereby corrected as shown below:

In the Related U.S. Application Data, after the sentence "Provisional application No. 60/022,474, Jun. 21, 1996.", add the sentence --Provisional application No. 60/026,970, Sep. 20, 1996.--

Column 1,
Line 8, delete the sentence "The present application is based upon U.S. Provisional patent Application Ser. No. 60/022,474, Filed Jun. 21, 1996.", and add the paragraph -- The presnet application claims the benefit of U.S. provisional Patent Application Ser. No. 60/022,474, filed June 21, 1996. The present application further claims the benefit of U.S. Provisional Patent Application Ser. No. 60/026,970, filed September 20, 1996. --

Column 12,
Line 10, after the word "though", delete "addition" and substitute therefor -- additional --.

Signed and Sealed this

Twenty-fourth Day of July, 2001

Attest:

NICHOLAS P. GODICI
Attesting Officer    Acting Director of the United States Patent and Trademark Office